United States Patent [19]
Vandenberg

[11] Patent Number: 5,397,226
[45] Date of Patent: Mar. 14, 1995

[54] SLIDE RETAINER FOR INJECTION MOLDS

[75] Inventor: Leo A. Vandenberg, Lake Zurich, Ill.

[73] Assignee: D-M-E Company, Madison Heights, Mich.

[21] Appl. No.: 144,420

[22] Filed: Nov. 2, 1993

[51] Int. Cl.[6] ............................................. B29C 45/33
[52] U.S. Cl. ................... 425/192 R; 425/441; 425/577; 425/DIG. 58
[58] Field of Search ............... 425/192 R, 556, 577, 425/441, 468, DIG. 58; 249/63, 64

[56] References Cited

U.S. PATENT DOCUMENTS

| | | | |
|---|---|---|---|
| 3,509,603 | 5/1970 | Halsall et al. | 425/577 |
| 4,179,254 | 12/1979 | Brown | 425/438 |
| 4,452,420 | 6/1984 | Lundquist | 249/175 |
| 4,515,342 | 5/1985 | Boskovic | 425/577 |
| 4,765,585 | 8/1988 | Wieder | 249/64 |
| 5,114,655 | 5/1992 | Cole | 425/577 |
| 5,234,329 | 8/1993 | Vandenberg | 425/577 |

FOREIGN PATENT DOCUMENTS 62-240522  10/1987  Japan .................................. 425/577

*Primary Examiner*—James P. Mackey
*Attorney, Agent, or Firm*—Henderson & Sturm

[57] ABSTRACT

A cam slide retainer for injection molds including an elongated rounded latch groove formed in the cam slide and a corresponding lock in the core retaining plate. The slide retainer is simple to install since the body portion of the lock is circular and is installed by press fitting into the core retaining plate from the back. A shoulder on the body portion is received in a counterbore to properly position the elongated rounded lock plunger head to extend above the inside surface of the core retaining plate. A flat key surface on the shoulder properly aligns the plunger head to extend transverse to the direction of the slide movement. The elongated rounded groove in the cam slide is positioned to matingly receive the elongated rounded plunger head when the slide is moved to the position away from the molded part to releasably lock the cam slide in position.

6 Claims, 1 Drawing Sheet

SLIDE RETAINER FOR INJECTION MOLDS

TECHNICAL FIELD

This invention relates to injection molding apparatus, and more particularly to a cam slide retainer used in an injection mold.

BACKGROUND ART

In injection molds, mating plates abut at a parting line to form an interior molding cavity. Frequently molded part details require additional movable cone pieces that must move in a plane disposed at ninety degrees to the movement of the plates as the mold is opened and closed. The cone pieces are attached to a cam slide which is moved by an angle pin. The angle pin is received in an angled bore extending through the core retaining plate and a corresponding angled opening in the cam slide. In the normal opening movement of the mold, the angle pin forces the slide laterally away from the molded piece on a guided path so the part can be removed from the molding cavity.

It is desirable to retain the cam slide in the retracted position and prevent unintentional movement. One known slide retainer is described in U.S. Pat. No. 4,765,585. The '585 patent shows a lock having an oblong body that is received in an oblong pocket machined in the core retaining plate and held in position with screws. Installation requires a significant amount of work: the oblong pocket must be cut out and fit just right; and the taps for the screws are small which presents problems with existing machine tools. Also, the latch shown in the '585 patent is secured to the cam slide by screws. Again, the taps for the screws are small which presents a machining problem.

Those concerned with these and other problems recognize the need for an improved slide retainer for injection molds.

DISCLOSURE OF THE INVENTION

The present invention provides a cam slide retainer for injection molds including an elongated rounded latch groove formed in the cam slide and a corresponding lock in the core retaining plate. The slide retainer is simple to install since the body portion of the lock is circular and is installed by press fitting into the core retaining plate from the back. A shoulder on the body portion is received in a counterbore to properly position the elongated rounded lock plunger head to extend above the inside surface of the core retaining plate. A flat key surface on the shoulder properly aligns the plunger head to extend transverse to the direction of the slide movement. The elongated rounded groove in the cam slide is positioned to matingly receive the elongated rounded plunger head when the slide is moved to the position away from the molded part to releasably lock the cam slide in position.

An object of the present invention is the provision of an improved slide retainer for injection molds.

Another object is to provide a slide retainer for injection molds that is inexpensive to manufacture.

A further object of the invention is the provision of a slide retainer that is easily installed in existing injection molds.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
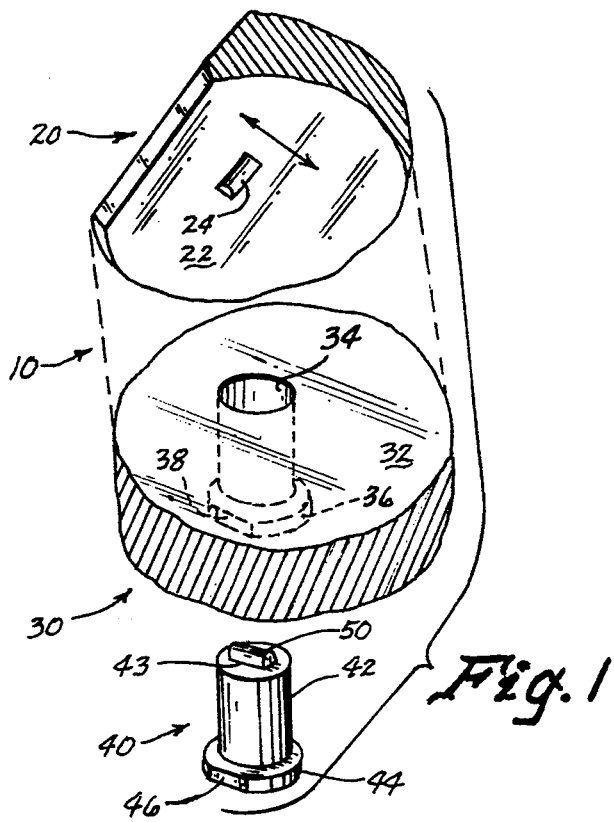
FIG. 1 is an exploded perspective view showing the elongated rounded latch groove formed in the bottom surface of the cam slide and the lock positioned to be press fit into the circular bore formed through the core retaining plate.

Referring now to the drawings, wherein like reference numerals designated identical or corresponding parts throughout the several views, FIG. 1 shows the slide retainer (10) of the present invention as used in a conventional injection mold. The mold includes a cam slide (20) having a bottom surface (22) movable in a linear path along the top surface (32) of the core retaining plate (30). The cam slide (20) has an elongated rounded latch groove (24) formed in the bottom surface (22). The groove (24) is disposed transverse to the linear path of movement of the cam slide (20) as indicated by the directional arrow. A circular bore (34) extends through the core retaining plate (30) perpendicular to the top surface (32). A counterbore forms a shoulder (36) below the top surface (32) and a flat key section (38) is formed on one side of the counterbore.

Figure 2:
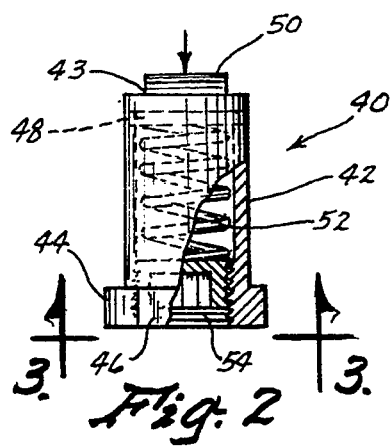
FIG. 2 is a side elevation partial sectional view of the lock with a portion cut away to show the spring biased plunger.
Figure 3:
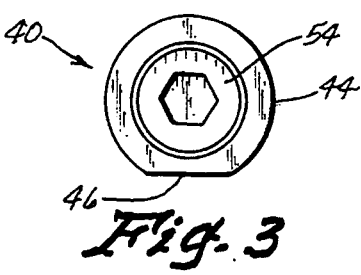
FIG. 3 is a bottom plan view of the lock taken along line 3—3 of FIG. 2.

As best shown in FIGS. 1-3, the lock (40) has a circular body portion (42), an enlarged lip section (44), and a flat key section (46) formed on one side of the lip section (44). A plunger (48) having an elongated rounded plunger head (50) is received in a cavity formed in the body portion (42). A spring (52) is held within the cavity by a threaded plug (54) and biases the plunger head (50) to extend up through an opening (43) in the top of the body portion (42). The circular body portion (42) of the lock (40) is matingly received within the circular bore (34) of the core retaining plate (30).

Figure 4:
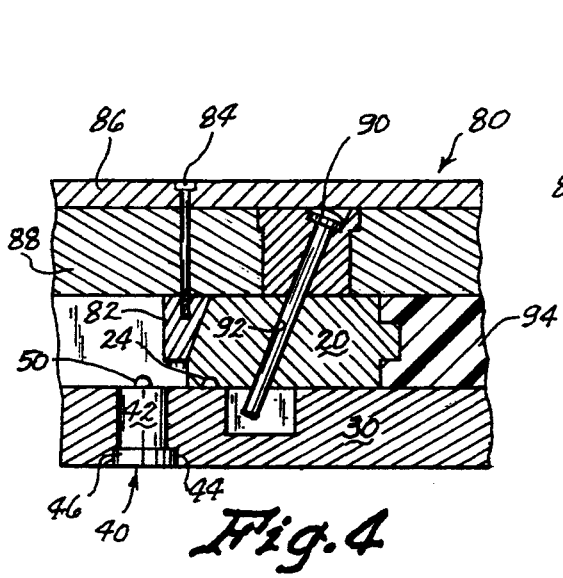
FIG. 4 is a partial side elevation sectional view showing the slide retainer of the present invention in a closed mold where the cam slide is positioned to engage the molded part, and the elongated rounded plunger head of the lock is spaced from the elongated rounded latch groove in the cam slide.
Figure 5:
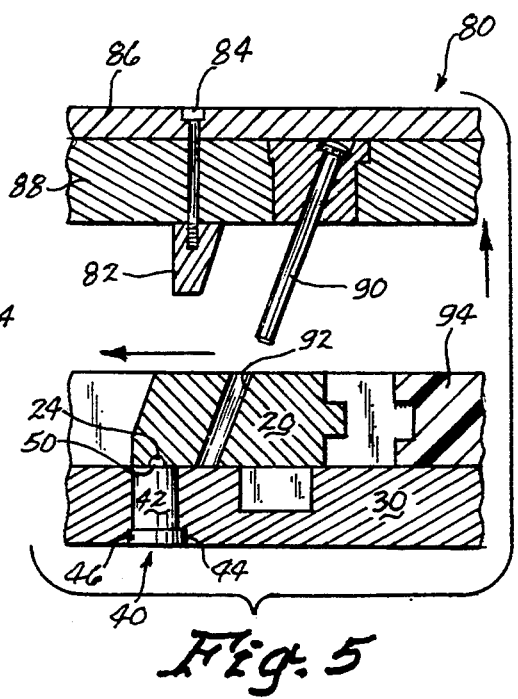
FIG. 5 is a partial side elevation sectional view showing the slide retainer in an open mold where the cam slide is moved to the left out of engagement with the molded part, and the elongated rounded plunger head of the lock engages the elongated rounded latch groove in the cam slide to hold the cam slide in the retracted position.

Referring now to FIGS. 4 and 5, the slide retainer (10) is used in a mold (80) that includes a heel block (82) secured by a bolt (84) to the exterior plate (86) and the cavity retaining plate (88). When the mold (80) is assembled, as in FIG. 4, the heel block (82) contacts the outer section of the cam slide (20) and an angle pin (90) is received in an opening (92) forcing the cam slide (20) to move along the top surface (32) of the core retaining plate (30) into engagement with the molded part (94).

To use the slide retainer (10) of the present invention, the elongated rounded latch groove (24) is formed in the bottom surface (22) of the cam slide (20), and the circular bore (34), counterbore, and flattened key section (38) are formed in the core retaining plate (30) as shown in FIG. 1. The lock (40) is inserted and press fit into the circular bore (34) so that the circular body portion (42) matingly engages the circular bore (34), the lip (44) engages the shoulder (36), and the flat key section (46) engages the key section (38) of the counterbore. Matingly engagement of the lip (44) with the shoulder (36) axially aligns the lock (60) with respect to the core retaining plate (30) so that the top surface of the body portion (42) is aligned coplanar with the top surface (32) of the plate (30). In this position, the elongated rounded plunger head (50) extends above the top surface (32) to selectively matingly engage the elongated rounded latch groove (24). Also, mating engagement of the flat key section (46) with the key section (38) radially aligns the body section (42) with respect to the plate (30) so that the elongated rounded plunger head (50) is aligned to engage the elongated rounded latch groove (24). The body portion (42) of the lock (40) is thus automatically oriented so that the plunger head (50) engages the groove (24) when the mold (80) is opened as shown in FIG. 5.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. In an injection mold including a cam slide having a bottom surface, the cam slide being selectively movable in a linear path along a top surface of a core retaining plate into and out of engagement with a molded part, an improvement comprising a slide retainer including:

an elongated rounded latch groove formed in the bottom surface of the cam slide and disposed transverse to the linear path of movement of the cam slide;

a circular bore formed through the core retaining plate;

a lock having a circular body portion matingly received within the circular bore, a plunger including an elongated rounded plunger head disposed within a cavity formed in the body portion of the lock, the elongated rounded plunger head being biased toward and extending above the top surface of the core retaining plate to selectively matingly engage the elongated rounded latch groove in the bottom surface of the cam slide when the cam slide is moved out of engagement with the molded part;

means for axially aligning the body portion with respect to the core retaining plate such that a top surface of the body portion is disposed substantially coplanar with the top surface of the core retaining plate; and means for radially aligning the body portion with respect to the core retaining plate such that the elongated rounded plunger head aligns with the elongated rounded latch groove.

2. The improvement of claim 1 wherein the axial alignment means includes a shoulder section formed in the circular bore and a lip section formed at one end of the body portion.

3. The improvement of claim 2 wherein the radial alignment means includes a flat key section formed in the shoulder section and a mating flat key section formed on the lip section.

4. The improvement of claim 2 wherein the shoulder section is formed as a counterbore at the bottom surface of the core retaining plate.

5. The improvement of claim 4 wherein the radial alignment means includes a flat key section formed in the shoulder section and a mating flat key section formed on the lip section.

6. The improvement of claim 1 wherein the circular body portion is press fit into the circular bore.

* * * * *